UNITED STATES PATENT OFFICE.

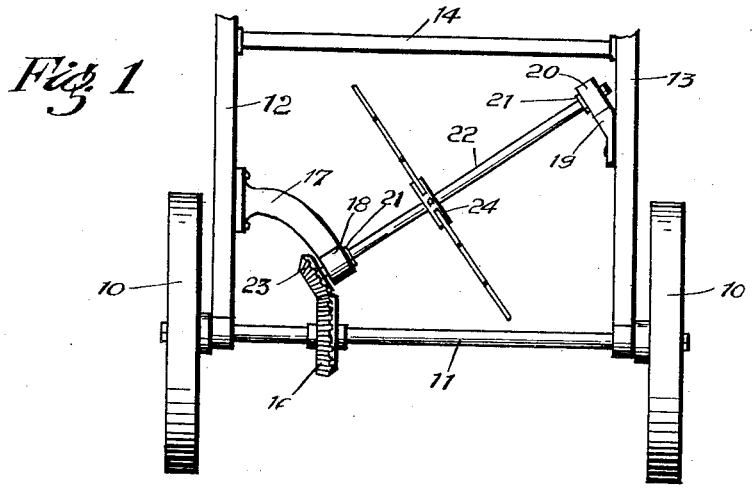
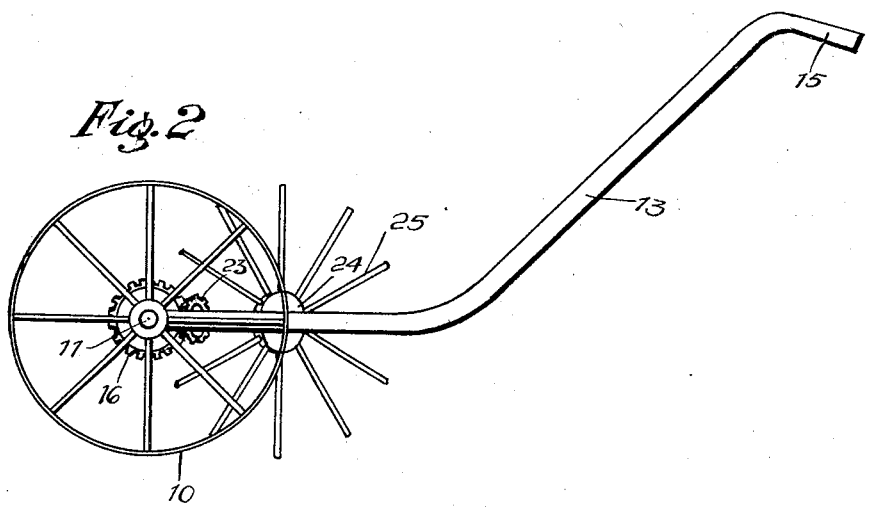
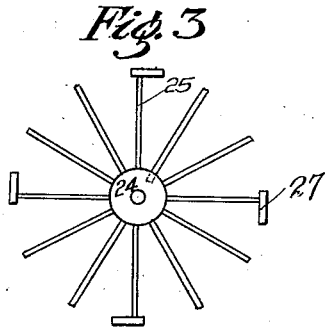

JOHN S. CLARKE, OF BOONE, IOWA.

ROTARY CULTIVATOR.

1,383,528.   Specification of Letters Patent.   Patented July 5, 1921.

Application filed March 25, 1919.  Serial No. 285,088.

*To all whom it may concern:*

Be it known that I, JOHN S. CLARKE, a citizen of the United States, and resident of Boone, in the county of Boone and State of Iowa, have invented a certain new and useful Rotary Cultivator, of which the following is a specification.

The object of my invention is to provide a rotary cultivator of simple, durable and inexpensive construction.

More particularly it is my object to provide a device which may be moved along over the rows of growing grain or vegetables to loosen the soil between the plants and to thereby loosen the soil around any weeds which may have sprouted, so that the latter will be killed out.

A further object of my invention is to provide a rotary device provided with earth working devices which will enter the soil adjacent to the plants and move through the soil in lines perpendicular to the direction of the row in which the plants are planted.

Still a further object is to provide a rotary earth working device arranged to move the earth working portions across the rows, wherein the devices which come in contact with the soil may be so constructed as to eliminate undesirable weeds and stir the soil without injuring the desirable plants.

Still a further object is to provide such a rotary cultivator to which devices may be secured to cut out the plants in a given row at regular intervals, to thereby thin out the total number of plants and permit better development.

Still a further object of my invention is to so arrange the rotary cultivating device that the earth working means thereon may travel at substantially right angles to the direction of movement of the machine when the machine is going at any of its speeds.

With these and other objects in view, my invention consists in the construction, arrangement and combination of the various parts of the device, whereby the objects contemplated are attained, as hereinafter more fully set forth, pointed out in my claim, and illustrated in the accompanying drawings, in which:

Figure 1 shows a top or plan view of my improved cultivator.

Fig. 2 shows a side elevation thereof.

Fig. 3 shows a side elevation of the rotary cultivating member in a slightly modified form.

Fig. 4 shows an end elevation of one of the forms of earth working devices which may be used with my rotary cultivator; and Fig. 5 shows a side elevation of the same device.

Referring to the accompanying drawings, I have used the reference numeral 10 to indicate traction wheels mounted on an axle 11 which is journaled in frame members 12 and 13. A cross brace 14 extends between the members 12 and 13, and the latter have formed at their rear ends handle members 15.

Fixed to the shaft 11 is a bevel gear 16, in position spaced from the frame member 12.

Extending inwardly and forwardly from the frame member 12 is a bracket 17 having a bearing 18 at the forward end thereof, with its axis inclined at an angle relative to the axis of the axle 11. A second bracket member 19 is secured to the member 13 rearwardly relative to the bracket 17, and has formed in its rear end a bearing 20 which has its axis aligned with the bearing 18.

Rotatably but nonslidably mounted in the bearings 18 and 20, by means of collars 21, is a shaft 22 which has secured to its forward end a beveled gear 23 designed to mesh at all times with the gear 16. Intermediate of the bearings 18 and 20 a hub 24 is secured to the shaft 22 and provided with openings in its periphery which are preferably screw-threaded to receive earth working devices 25.

In the form of earth working devices shown I have used flexible steel wires having their inner ends screw-threaded to coact with similar threads within the openings in the hub 24. In Figs. 4 and 5 I have shown a substantially rigid rod 26 having one end screw-threaded to coact with the openings in the hub 24, and the other end provided with a cutting device 27.

In the practical operation of my improved device the parts are assembled as shown in the drawings, and the frame-work moved longitudinally along the rows of plants in the garden or field, with the row between the wheels 10.

It will be noted that the shaft 22 is set at an angle relative to the shaft 11 so that by properly arranging the wheels 10, the gears 16 and 23, and the rotary earth working device, the ends of the wires 25 will travel deepest in the middle line between rows of plants and shallowest nearest the plants, so as to minimize the liability of injury to the plants.

I have used this device for stirring up the soil around garden truck, and find that I am able to pulverize the surface soil, thereby tearing loose the roots of any small weeds which may have sprouted, and killing the weeds, and am also able to form the dust mulsh which is so desirable in preventing too rapid evaporation of the moisture from the ground.

Where the earth working devices shown in Figs. 4 and 5 are used, it is possible to cut out plants which have been sown in a row in equally spaced intervals, thereby eliminating the large amount of labor and care usually necessary for thinning out too thickly planted garden truck.

Some changes may be made in the structure of the rotary cultivator or the manner of its attachment to the cultivating frame, without departing from the spirit of my invention; as, for instance, certain modifications may be necessary for mounting this device on a horse-drawn cultivator, or certain modifications may be made in the form of the earth engaging devices which are secured to the hub 24, and it is my intention to cover by my claim any modified forms of structure and use of mechanical equivalents which may be reasonably included within their scope.

I claim as my invention:

In a device of the class described, a frame, an axle thereon, traction wheels on said axle, a shaft journaled on said frame with its axis disposed at an angle relative to the transverse axis of the frame, a hub on said shaft, a plurality of substantially straight resilient earth working devices detachably mounted on said hub, and extended radially therefrom, part of said earth working devices at regular intervals having at their outer ends laterally extending blades, and means for rotating said shaft.

Des Moines, Iowa, March 4, 1919.

JOHN S. CLARKE.